United States Patent
Park et al.

(10) Patent No.: US 9,001,533 B2
(45) Date of Patent: Apr. 7, 2015

(54) FEEDBACK CIRCUIT AND POWER SUPPLY DEVICE INCLUDING THE SAME

(75) Inventors: In-Ki Park, Anyang (KR); Won-Seok Kang, Suwon (KR); Gye-Hyun Cho, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 293 days.

(21) Appl. No.: 13/475,696

(22) Filed: May 18, 2012

(65) Prior Publication Data

US 2012/0314459 A1 Dec. 13, 2012

(30) Foreign Application Priority Data

Jun. 8, 2011 (KR) .................. 10-2011-0055163

(51) Int. Cl.
*H02M 3/335* (2006.01)
*H02M 1/00* (2006.01)

(52) U.S. Cl.
CPC .. *H02M 3/33523* (2013.01); *H02M 2001/0019* (2013.01); *Y10S 323/902* (2013.01)

(58) Field of Classification Search
CPC ............ H02M 3/335; H02M 3/33507; H02M 3/33523
USPC .............................. 323/902; 363/21.15–21.18
See application file for complete search history.

(56) References Cited

U.S. PATENT DOCUMENTS

| 5,675,485 | A | 10/1997 | Seong |
| 6,903,945 | B2 | 6/2005 | Kitano |
| 7,035,121 | B2 * | 4/2006 | Umetsu ...................... 363/21.11 |
| 7,408,332 | B2 | 8/2008 | Yee |
| 2011/0157925 | A1 * | 6/2011 | Wang ........................ 363/21.17 |

FOREIGN PATENT DOCUMENTS

WO    WO 2011/015391    *  2/2011    ............ H02M 3/335

OTHER PUBLICATIONS

AN-6300, FAN6300 / FAN6300A / FAN6300H Highly Intergrated Quasi-Resonant PWM Controller, 2009, pp. 1-13, Fairchild Semiconductor Corporation.

* cited by examiner

*Primary Examiner* — Harry Behm
*Assistant Examiner* — Matthew Grubb
(74) *Attorney, Agent, or Firm* — Okamoto & Benedicto LLP

(57) ABSTRACT

Disclosed are a feedback circuit and a power supply device including the same. The power supply device converts input voltage into output voltage suitable for load condition according to a switching operation of a power switch. The feedback circuit includes a first diode connected to a first sensing voltage corresponding to output voltage and a second diode connected to the output voltage. The feedback circuit generates feedback voltage by using voltage passing through a conducted diode of the first and the second diodes. The power supply device controls a switching operation of the power switch depending on the feedback voltage.

17 Claims, 4 Drawing Sheets

FEEDBACK CIRCUIT AND POWER SUPPLY DEVICE INCLUDING THE SAME

CROSS-REFERENCE TO RELATED APPLICATION

This application claims priority to and the benefit of Korean Patent Application No. 10-2011-0055163 filed in the Korean Intellectual Property Office on Jun. 8, 2011, the entire contents of which are incorporated herein by reference.

BACKGROUND (a) Field

Embodiments relate to a feedback circuit and a power supply device including the same. Particularly, Embodiments relate to a feedback circuit for preventing an output voltage overshoot of a power supply device and a power supply device including the same.

(b) Description of the Related Art

In a system in which a control loop for variation in output voltage is slow, the output voltage may be increased by overvoltage. A power supply device may be controlled so that fluctuation which is generated in an AC line connected to an input terminal is not reflected to the output voltage and current. To this end, a constant voltage and constant current control loop of the power supply device may be used, but response to the control loop may be slower as compared with rapid fluctuation in input voltage and a load.

For example, an overshoot of the output voltage may be generated during a start-up period of the power supply device. When the control loop is relatively slow, an operation of the power supply device for the fluctuation in the output voltage of the power supply device is not rapidly controlled.

In detail, when the power supply device is controlled by a pulse width modulation method, a pulse width modulation controller may control a duty cycle of a power switch according to feedback voltage corresponding to the fluctuation in the output voltage. When the control loop is slow, the feedback voltage does not respond promptly to the increase of the output voltage and particularly, the feedback voltage of the controller keeps in a maximum value while the output voltage increases during the start-up period. Then, an overshoot of the output voltage in an optimal level or more is generated while the feedback voltage keeps in a maximum value and until the feedback voltage is decreased at the optimal level by reacting to the overshoot of the output voltage, the output voltage is maintained by the overvoltage.

The overshoot and the overvoltage of the output voltage damage the load connected to the output terminal and components of the power supply device and excessively increase drain-source voltage of the power switch.

The problems may also occur in the case where the input voltage of the power supply device is rapidly increased or the load is rapidly fluctuated, as well as the start-up period.

The above information disclosed in this Background section is only for enhancement of understanding of the background of the invention and therefore it may contain information that does not form the prior art that is already known in this country to a person of ordinary skill in the art.

SUMMARY

Embodiments have been made in an effort to provide a feedback circuit having an advantage of preventing an overshoot of output voltage and a power supply device including the same.

An exemplary embodiment of the present invention provides a power supply device including a feedback circuit in order to convert input voltage into output power according to a switching operation of a power switch. The feedback circuit includes a first diode connected to a first sensing voltage corresponding to output voltage of the output power and a second diode connected to the output voltage and generates feedback voltage by using voltage passing through a conducted diode of the first and the second diodes. The power supply device includes a switch controller controlling a switching operation of the power switch depending on the feedback voltage.

The feedback circuit further includes a third diode connected to a second sensing voltage corresponding to output current and generates feedback voltage by using voltage passing through a conducted diode among the first to the third diodes.

A cathode of each of the first to the third diodes is electrically connected to a first contact point, the first sensing voltage is inputted to an anode of the first diode, the second sensing voltage is inputted to an anode of the third diode, and the output voltage is inputted to an anode of the second diode.

The feedback circuit further includes a photo diode connected electrically to the first contact point and a photo transistor including the photo diode and an opto-coupler and the feedback voltage is controlled depending on the current flowing in the photo transistor.

The feedback circuit further includes a voltage feedback unit which generates the first sensing voltage by amplifying a difference between the output voltage distributed by at least two resistors and a predetermined first reference voltage.

The voltage feedback unit includes an operational amplifier including a first input terminal in which the distributed voltage is inputted and a second input terminal in which the first reference voltage is inputted, and a first resistor and a capacitor connected between an output terminal and the first input terminal of the operational amplifier in series, in which voltage of the output terminal of the operational amplifier is the first sensing voltage and the output terminal of the operational amplifier is connected to the anode of the first diode.

The feedback circuit further includes a current feedback unit generating the second sensing voltage by amplifying a difference between voltage adding the voltage generated in the resistor in which the output current flows to the predetermined first reference voltage and a predetermined second reference voltage.

The current feedback unit includes a first resistor including one end in which the voltage generated in the resistor is inputted, a second resistor connected to the first reference voltage and the other end of the first resistor, an operational amplifier including a first input terminal connected to the other end of the first resistor and a second input terminal in which the second reference voltage is inputted, and a third resistor and a capacitor connected between an output terminal and the first input terminal of the operational amplifier in series, in which voltage of the output terminal of the operational amplifier is the second sensing voltage and the output terminal of the operational amplifier is connected to an anode of the third diode.

The feedback circuit further includes a first resistor connected between a cathode of the second diode and the first contact point and a second resistor connected between the first contact point and an anode of the photo diode.

The power supply device a first coil connected to one end connected with the input voltage and the power switch and an auxiliary coil having a predetermined winding ratio with the first coil.

The switch controller turns on the power switch when a zero detecting voltage reaches a predetermined turn-on reference voltage according to the voltage of the auxiliary coil and turns off the power switch when a predetermined sawtooth wave reaches the feedback voltage.

Another exemplary embodiment of the present invention provides a feedback circuit applied to a power supply device converting input voltage into output power according to a switching operation of a power switch. The feedback circuit supplies feedback voltage for controlling the switching operation. The feedback circuit includes a voltage feedback unit generating a first sensing voltage corresponding to output voltage of the output power, a first diode connected to the first sensing voltage, and a second diode connected to the output voltage, in which feedback voltage is generated by using voltage passing through a conducted diode of the first and the second diodes.

The feedback circuit further includes a current feedback unit generating a second sensing voltage corresponding to the output current and a third diode connected to the second sensing voltage, in which feedback voltage is generated by using voltage passing through a conducted diode of the first to the third diodes.

According to an exemplary embodiment of the present invention, the feedback circuit and the power supply device including the same capable of preventing the overshoot of the output voltage can be provided.

DETAILED DESCRIPTION OF THE EMBODIMENTS

Figure 1:
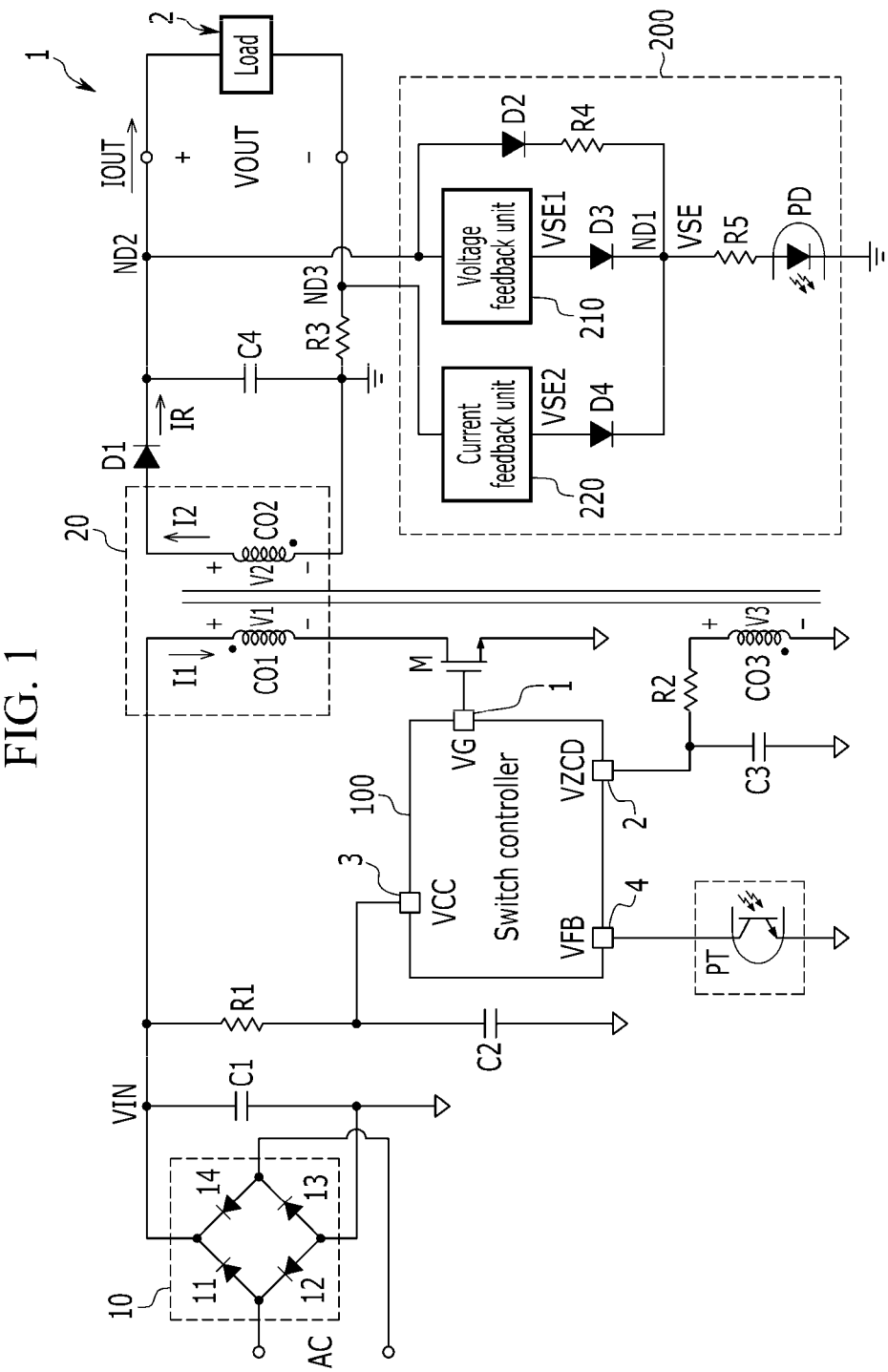
FIG. 1 is a diagram illustrating a power supply device according to an exemplary embodiment of the present invention.

Embodiments will be described more fully hereinafter with reference to the accompanying drawings, in which embodiments are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 is a diagram illustrating a power supply device according to an exemplary embodiment of the present invention.

As shown in FIG. 1, a power supply device 1 is implemented by a flyback converter. However, the flyback converter is only an exemplary embodiment of the present invention and the present invention is not limited thereto.

The power supply device 1 includes a bridge RC diode 10, a power switch M, a switch controller 100, a feedback circuit 200, a transformer 20, a RC diode D1, and an output capacitor C2.

The bridge RC diode 10 rectifies an AC input to generate input voltage VIN. The bridge RC diode 10 includes four diodes 11 to 14.

A smooth capacitor C1 smoothes a ripple component of the input voltage VIN.

The transformer 20 converts a primary side power generated by the input voltage VIN to transfer the converted power to a secondary side. The transformer 20 includes a first coil CO1 disposed at the primary side and a second coil CO2 disposed at the secondary side. The first coil CO1 includes one end receiving the input voltage VIN and the other end connected to the power switch M. The second coil CO2 is formed at the secondary side and voltage and current are generated at the second coil CO2 by the power transferred from the primary side. The primary side and the secondary side are insulated from each other.

A winding ratio nps (the winding number ns of CO2/the winding number np of CO1) is determined depending on the winding number of the first coil CO1 and the winding number of the second coil CO2. A ratio V2/V1 of the voltage V1 of the first coil CO1 to the voltage V2 of the second coil CO2 of the transformer 20 is proportional to the winding ratio nps and a ratio I2/I1 of the current I1 of the first coil CO1 to the current I2 of the second coil CO2 is inversely proportional to the winding ratio nps.

The power supply device according to the exemplary embodiment of the present invention is implemented by the flyback converter and includes the transformer as a unit for converting the input voltage to the output power, but the present invention is not limited thereto. Instead of the flyback converter, other non-insulating topology converter may be used.

The RC diode D1 includes an anode connected to one end of the second coil CO2 and a cathode connected to one end of an output capacitor C4. The RC diode D1 rectifies the current I2 flowing in the second coil CO2. The current IR flowing through the RC diode D1 is supplied to a load or charges the output capacitor C4.

The output capacitor C4 is charged by the current IR or discharged in order to supply the current to the load 2.

The power switch M is connected to the first coil CO1 and the current I1 flowing in the first coil CO1 is controlled by the switching operation of the power switch M. The current I1 is increased while the power switch M is turned on and does not flow while the power switch M is turned off.

While the power switch M is turned on, the current I1 is increased to store energy in the first coil CO1. In this case, since the RC diode D1 is off, the current does not flow in the second coil CO2. While the power switch M is turned off, the current I2 of the second coil CO2 flows from the second coil CO2 to the anode of the RC diode D1 and is rectified through the RC diode D1 to generate the current IR.

The power supply device 1 according to the exemplary embodiment of the present invention supplies the power to the load 2 requiring a control of predetermined output voltage VOUT and predetermined output current IOUT. For example, the load 2 may be a light emitting device configured by a plurality of LED diodes.

Accordingly, the switch controller 100 receives feedback information on the output current VOUT and the output current IOUT and controls the switching operation of the power switch M so that the output voltage VOUT and the output current IOUT are constant.

When the output voltage VOUT or the output current IOUT is increased at an optimal level or more, the switch controller 100 decreases a duty of the power switch M to decrease the power transferred to the secondary side. On the other hand, when the output voltage VOUT is decreased at an optimal level or less, the switch controller 100 increases the duty of the power switch M to increase the power transferred to the secondary side. The output voltage VOUT and the output current IOUT are constantly maintained by the operation described above.

The feedback circuit 200 generates feedback voltage VFB corresponding to the output voltage VOUT and the output current IOUT to transfer the feedback voltage VFB to the switch controller 100. The feedback voltage VFB varies depending on the output voltage VOUT and the output current IOUT.

The feedback circuit 200 generates a first sensing voltage VSE1 corresponding to the output voltage VOUT and a second sensing voltage VSE2 corresponding to the output current IOUT and generates the feedback voltage by using at least one of the first sensing voltage VSE1, the second sensing voltage VSE2, and the output voltage VOUT.

The feedback circuit 200 generates the first sensing voltage VSE1 depending on a difference between the voltage corresponding to the output voltage VOUT and a predetermined first reference voltage. The feedback circuit 200 generates the second sensing voltage VSE2 depending on a difference between the voltage corresponding to the output current IOUT and a predetermined second reference voltage.

The feedback circuit 200 includes a current feedback unit 220, a voltage feedback unit 210, three diodes D2 to D4, two resistors R4 and R5, a photo diode PD, and a photo transistor PT.

The voltage feedback unit 210 generates the first sensing voltage VSE1 by amplifying a difference between voltage according to the output voltage VOUT (e.g., voltage in which the output voltage VOUT is resistance-distributed) and the first reference voltage.

The current feedback unit 220 generates the second sensing voltage VSE2 by amplifying a difference between voltage adding voltage according to the output current IOUT (e.g., voltage generated when flowing through the resistor R3) to the first reference voltage and the second reference voltage.

Hereinafter, the voltage adding voltage according to the output current IOUT to the first reference voltage is referred to as the voltage corresponding to the output current IOUT. The first sensing voltage VSE1 and the second sensing voltage VSE2 are connected to a contact point ND1 and the diode D2 and the resistor R4 are connected between the output voltage VOUT and the contact point ND1. As a result, instead of the first sensing voltage VSE1 and the second sensing voltage VSE2, the voltage corresponding to the output voltage VOUT is transferred to the contact point ND1 without a delay from a time of generating the output voltage VOUT, while the output voltage VOUT is increased during the start-up period.

A predetermined delay exists between a change time when variation in the output voltage VOUT is reflected at the first sensing voltage VSE1 and the second sensing voltage VSE2 and a time when the variation in the output voltage VOUT is generated. The reason is because a control loop for the variation in the output voltage VOUT is actually slow. The delay may cause the overshoot generation of the output voltage VOUT during the start-up period.

The feedback circuit 200 according to the exemplary embodiment of the present invention includes a configuration transferring the output voltage VOUT to the contact point ND1 through the diode D2 and the resistor R4 in order to prevent the overshoot of the output voltage VOUT. When the overshoot of the output voltage VOUT is generated during the start-up period, the voltage of the contact point ND1 is rapidly increased by the output voltage VOUT and the feedback voltage VFB is rapidly decreased. As a result, the overshoot of the output voltage VOUT may be rapidly transferred to the switch controller 100.

In detail, the current flowing in the photo diode PD is determined depending on the contact point ND1 and the current of the photo transistor PT is also determined depending on the current flowing in the photo diode PD. Accordingly, the overshoot of the output voltage VOUT is immediately reflected to the current flowing in the photo diode PD, such that the current flowing in the photo transistor PT is changed. In that case, the feedback voltage VFB is decreased, such that the switch controller 100 reduces the duty of the power switch M.

As such, the overshoot of the output voltage VOUT is immediately reflected to the switching operation of the power switch M, such that the output voltage VOUT can be rapidly stabilized.

The switch controller 100 generates a gate signal VG controlling the operation of the power switch M according to zero detecting voltage VZCD and the feedback voltage VFB. Power supply voltage VCC for the operation of the switch controller 100 is generated by a resistor R1 and a capacitor C2.

The resistor R1 includes one end connected to the input voltage VIN and the other end connected to one end of the capacitor C2. The other end of the capacitor C2 is grounded. The power supply voltage VCC is supplied from the capacitor C2 charged by the input voltage VIN.

An auxiliary coil CO3 has a predetermined winding ratio and is insulatively coupled with the first coil CO1. One end of the auxiliary coil CO3 is connected to one end of the resistor R2 and the other end of the auxiliary coil CO3 is grounded. The other end of the resistor R2 is connected to a pin 2 and one end of a capacitor C3. The other end of the capacitor C3 is grounded.

Voltage V3 generated in the auxiliary coil CO3 is transferred to the switch controller 100 through the resistor R2 and the capacitor C3 attenuates a noise of the voltage V3. The voltage V3 becomes the zero detecting voltage VZCD through the resistor R2 and the capacitor C3.

The switch controller 100 includes a pin 1 outputting the gate signal 1, a pin 2 receiving the zero detecting voltage VZCD, a pin 3 receiving the power supply voltage VCC, and a pin 4 receiving the feedback voltage VFB.

The switch controller 100 turns-on the power switch M when the zero detecting voltage VZCD reaches predetermined turn-on reference voltage. In detail, when the zero detecting voltage VZCD is decreased after the turn-off of the power switch M and the decreased zero detecting voltage VZCD reaches the turn-on reference voltage, the gate signal VG which turns-on the power switch M is generated.

The switch controller 100 compares the feedback voltage VFB with a predetermined sawtooth wave and turns off the power switch M when the sawtooth wave reaches the feedback voltage VFB. The sawtooth wave according to the exemplary embodiment of the present invention starts to increase from the turn-on time of the power switch M and decreases after a sawtooth wave signal reaches the feedback voltage VFB.

The switch controller 100 receives the feedback voltage VFB according to the current flowing in the photo transistor PT. The feedback voltage VFB decreases as the current flowing in the photo transistor PT increases and increases as the current decreases.

Accordingly, when the current flowing in the photo transistor PT is changed by changing the output voltage VOUT or the output current IOUT, the feedback voltage VFB is changed depending on the current flowing in the photo transistor PT.

For example, when the output voltage VOUT or the output current IOUT increases at an optimal level or more and the current flowing in the photo transistor PT increases, the feedback voltage VFB decreases and the duty of the power switch M decreases. When the output voltage VOUT decreases at an optimal level or less and the current flowing in the photo transistor PT decreases, the feedback voltage VFB increases and the duty of the power switch M increases.

Hereinafter, a configuration of a feedback circuit 200 according to an exemplary embodiment of the present invention will be described with reference to FIG. 2.

Figure 2:
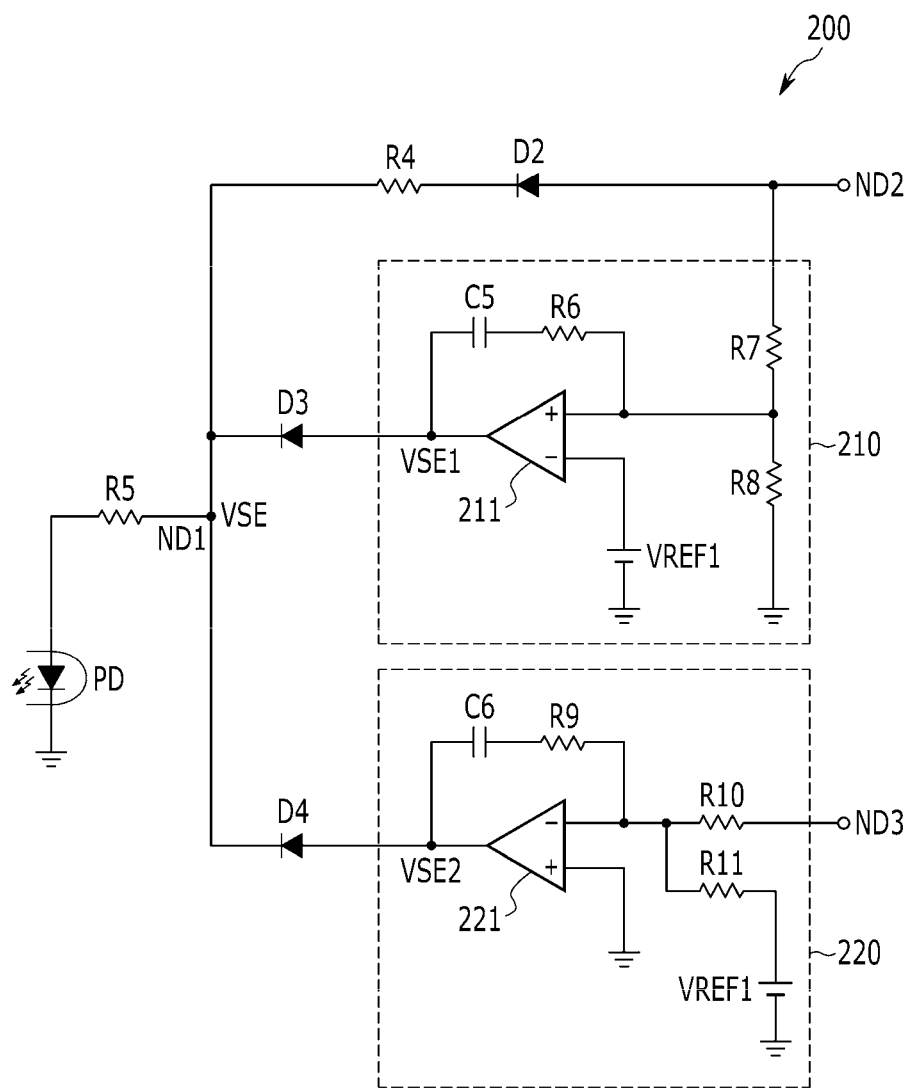
FIG. 2 is a diagram illustrating a feedback circuit according to an exemplary embodiment of the present invention.

FIG. 2 is a diagram illustrating a feedback circuit according to an exemplary embodiment of the present invention.

When the diode D2 is conducted by the output voltage VOUT, the output voltage VOUT is transferred to the contact point ND1 through a resistor R4. In this case, voltage transferred to the contact point ND1 by the conduction of the diode D2 is determined by the resistor R4, a resistor R5, an on-resistor of the photo diode PD. However, the on-resistor of the photo diode PD may be ignored as a very small value as compared with the resistor R4 and the resistor R5. Accordingly, a ratio of the resistor R4 to the resistor R5 may be set so that the voltage of the contact point ND1 is determined according to the output voltage VOUT while the overshoot of the output voltage VOUT can be generated like the start-up period.

The voltage feedback unit 210 includes an operational amplifier 211, three resistors R6 to R8, and a capacitor C5.

The resistor R7 and the resistor R8 are connected between a contact point ND2 and a ground in series and the contact point to which the resistor R7 and the resistor R8 are connected is connected to a non-inverting terminal (+) of the operational amplifier 211. The output voltage VOUT is distributed to the resistor R7 and the resistor R8 and voltage inputted to the non-inverting terminal (+) of the operational amplifier 211 is VOUT*(R8/(R7+R8)).

A first reference voltage VREF1 is inputted to an inverting terminal (−) of the operational amplifier 211. The capacitor C5 and the resistor R6 are connected between the non-inverting terminal (+) and an output terminal of the operational amplifier 211 in series. The operational amplifier 211 generates the first sensing voltage VSE1 by amplifying a difference between the voltage VOUT*(R8/(R7+R8)) corresponding to the output voltage VOUT and the first reference voltage VREF1.

The diode D3 is connected between the output terminal of the operational amplifier 211 and the contact point ND1. When the diode D3 is conducted by the first sensing voltage VSE1 of the operational amplifier 211, the first sensing voltage VSE1 is transferred to the contact point ND1.

The current feedback unit 220 includes an operational amplifier 221, four resistors R9, R10, R11, and R12, and a capacitor C6.

The resistor R10 is connected between a contact point ND3 and an inverting terminal (−) of the operational amplifier 221. The resistor R11 connected with the first reference voltage VREF1 (in series is connected to the inverting terminal (−) together with the resistor R10 as a parallel circuit. Accordingly, the voltage of the contact point ND3 becomes the voltage corresponding to the output current IOUT by being added to the first reference voltage VREF1 and the voltage corresponding to output current IOUT is inputted to the inverting terminal (−). Ground voltage is inputted to a non-inverting terminal (+) of the operational amplifier 221 as second reference voltage and the capacitor C6 and the resistor R9 are connected between the inverting terminal (−) and an output terminal of the operational amplifier 221 in series.

The operational amplifier 221 generates the second sensing voltage VSE2 by amplifying a difference between the voltage corresponding to the output current IOUT and the ground voltage. The diode D4 is connected between the output terminal of the operational amplifier 221 and the contact point ND1. When the diode D4 is conducted by the second sensing voltage VSE2, the second sensing voltage VSE2 reaches the contact point ND1.

As described above, among the first and the second sensing voltages VSE1 and VSE2 and the output voltage VOUT, the voltage transferred to the contact point ND1 is selected. Hereinafter, the voltage of the contact point ND1 is referred to as output sensing voltage VSE.

The feedback circuit according to the exemplary embodiment of the present invention generates the feedback voltage by using the first sensing voltage corresponding to the voltage of the output power, the second sensing voltage corresponding to the current of the output power, and the output voltage. However, the present invention is not limited thereto and the feedback circuit may generate the feedback voltage by using the first sensing voltage and the output voltage during at least the start-up period.

Hereinafter, an operation of a power supply device will be described with reference to FIG. 3.

Figure 3:
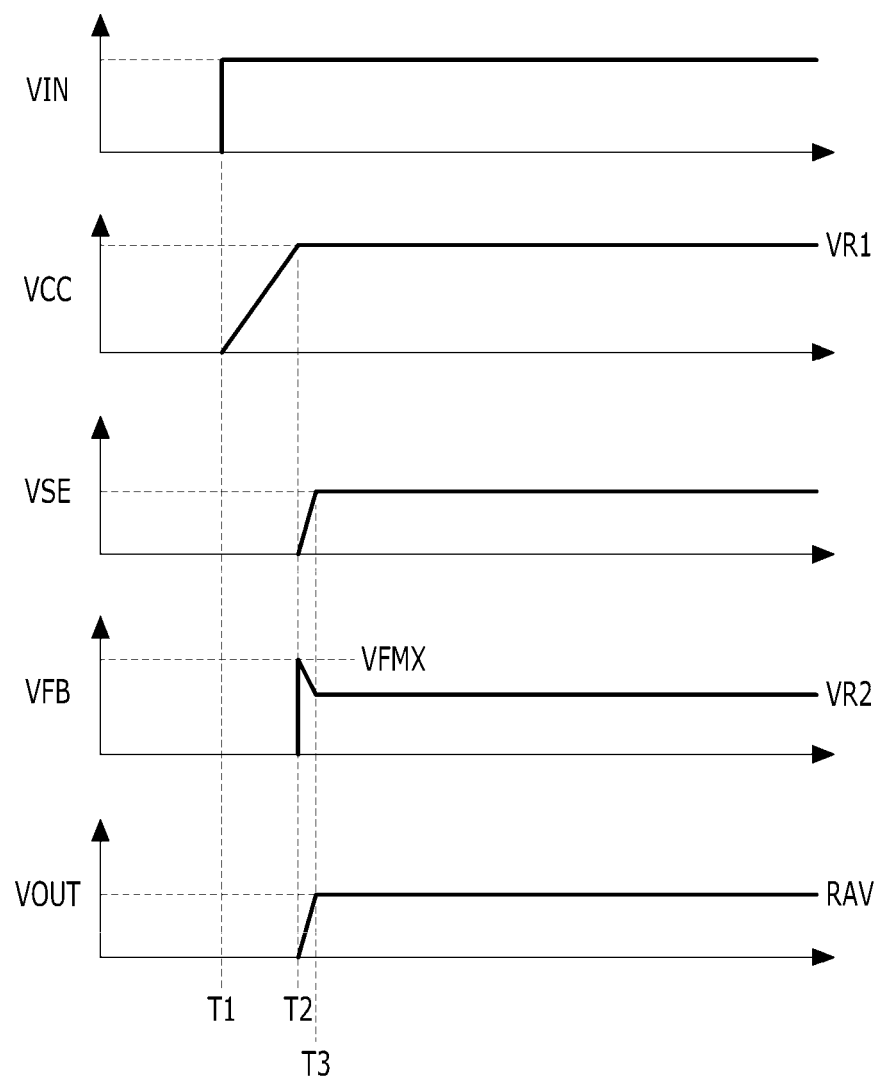
FIG. 3 is a waveform diagram illustrating voltages generated during a start-up period of a power supply device according to an exemplary embodiment of the present invention.

FIG. 3 is a waveform diagram illustrating voltages generated during a start-up period of a power supply device according to an exemplary embodiment of the present invention.

FIG. 3 shows input voltage VIN, power supply voltage VCC, output sensing voltage VSE, feedback voltage VFB, and output voltage VOUT.

When the power supply device 1 is powered-on at a time T1, the input voltage VIN is generated. The power supply voltage VCC starts to increase by the input voltage VIN from the time T1. Before the power supply voltage VCC reaches a predetermined level of reference voltage VR1, the power switch M does not perform the switching operation.

When the power supply voltage VCC reaches the reference voltage VR1 at a time T2, the power switch M starts to operate the switching and the output voltage VOUT starts to increase from the time T2. As described above, after the delay time elapses from the time T2, the first sensing voltage VSE1 and the second sensing voltage VSE2 are generated. Accordingly, while the delay time elapses from the time T2, the output voltage VOUT is transferred to the contact point ND1 through the diode D2 and the resistor R4.

Therefore, the output sensing voltage VSE is generated from the time T2 and is determined depending on the output voltage VOUT. The feedback voltage VFB rapidly increases as a maximum feedback voltage VFMX at the time T2 because the output sensing voltage VSE is low.

After the time T2, the output sensing voltage VSE also increases according to the increasing output voltage VOUT and the feedback voltage VFB decreases. The output voltage VOUT reaches a rated voltage RAV at a time T3 and the feedback voltage VFB also reaches a reference voltage VR2 according to the output sensing voltage VSE. When the feedback voltage VFB is maintained as the reference voltage VR2, the output voltage VOUT is maintained as the rated voltage RAV.

As shown in FIG. 3, during the start-up period of time when the power supply device 1 is powered-on and the output voltage VOUT is stabilized as the rated voltage, the overshoot of the output voltage VOUT does not occur.

However, in a known power supply device, the feedback voltage corresponds to variation in the output voltage to generate the delay, such that the overshoot occurs.

Figure 4:
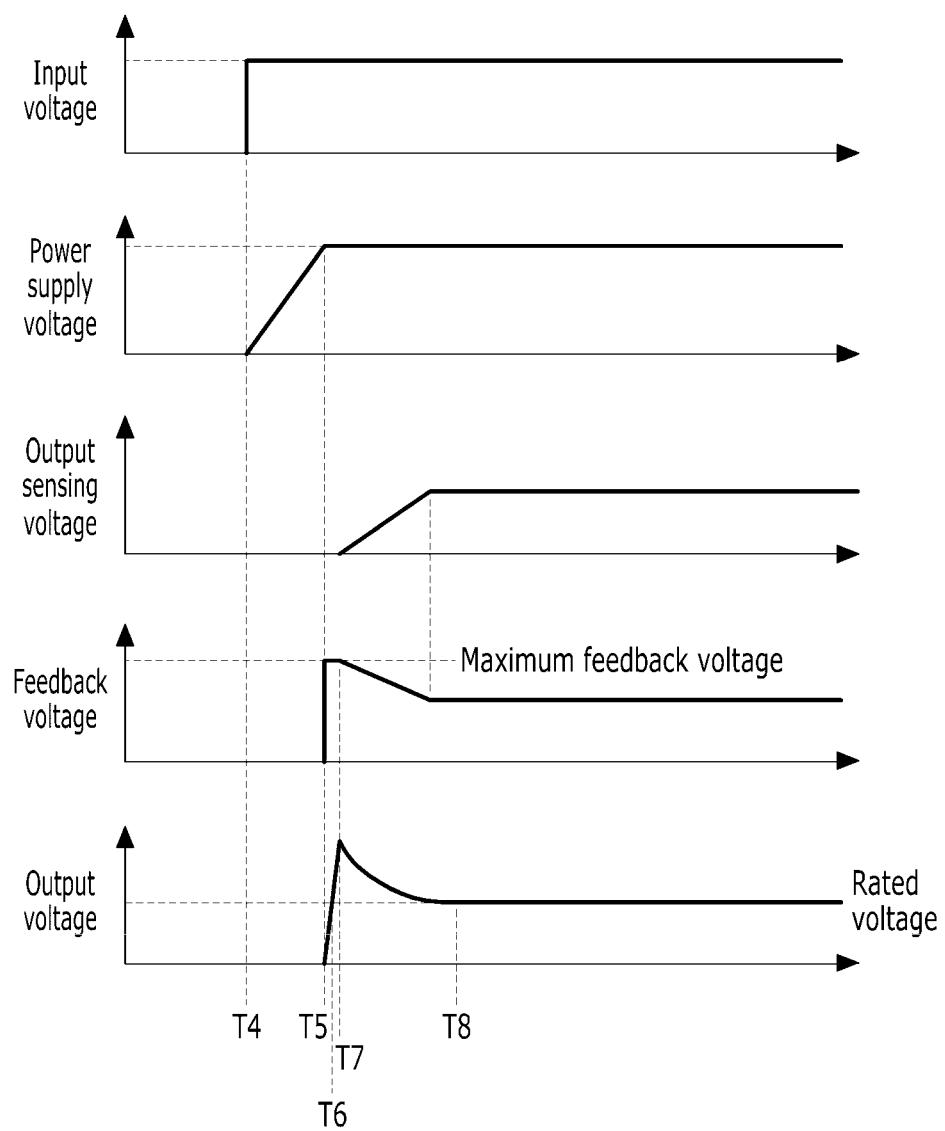
FIG. 4 is a diagram illustrating voltage generated during an operation of a known power supply device.

FIG. 4 is a diagram illustrating voltage generated during an operation of a known power supply device. In detail, FIG. 4 shows the case where a path formed between the output voltage VOUT and the photo diode PD through the diode D2 and the resistor R4 according to the exemplary embodiment of the present invention does not exist. Hereinafter, input voltage, power supply voltage, output sensing voltage, feedback voltage, and output voltage are not the voltages of the power supply device according to the exemplary embodiment of the present invention.

As shown in FIG. 4, the power supply device is powered-on at a time T4 and the power supply voltage increases during the periods of time T4 to T5.

The switching operation is generated from the time T5 and the output voltage starts to increase. The output voltage of the time T5 is low and the delay of the output sensing voltage continues up to a time T7, such that the feedback voltage increasing at the maximum feedback voltage at the time T5 is maintained at the maximum feedback voltage up to the time T7. Then, the output voltage reaches the rated voltage at the time T6, but the overshoot of the output voltage occurs by the feedback voltage which is maintained at the maximum feedback voltage up to the time T7 due to the delay.

After the time T7, the output sensing voltage is generated and the feedback voltage starts to decrease. In addition, the output voltage starts to decrease by the feedback voltage decreasing from the time T7 and the output voltage is stabilized at a time T8.

As described above, the overshoot of the output voltage occurs during the time T6 to the time T8 and the output voltage is in an over-voltage state.

Unlike the related art, the feedback circuit 200 according to the exemplary embodiment of the present invention generates the feedback voltage VFB without the delay of the output voltage VOUT, such that the overshoot of the output voltage VOUT can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

Power supply device 1, Bridge RC diode 10, Smooth capacitor C1 Transformer 20, Switch controller 100, Feedback circuit 200 RC diode D1, Diode (D2-D4, 11-14), Output capacitor C4 Capacitor (C2, C3, C5, C6) First coil CO1, Second coil CO2 Auxiliary coil CO3, Power switch M, Resistor (R1-R10), Photo diode (PD), Photo transistor (PT), Feedback circuit 200, Switch controller 100, Current feedback unit 210, Voltage feedback unit 220 Operational amplifier 211, 221

What is claimed is:

1. A power supply device converting an input voltage into an output power according to a switching operation of a power switch, the power supply device comprising:
    a feedback circuit which includes a first diode connected to a first sensing voltage corresponding to an output voltage of the output power, a second diode connected to the output voltage, and a resistor in series with the second diode, the feedback circuit generates a feedback voltage by using a voltage generated from a current passing through a conducted diode of the first and the second diodes; and
    a switch controller controlling the switching operation of the power switch depending on the feedback voltage,
    wherein a cathode of each of the first to the second diodes is electrically connected to a first contact point, the first sensing voltage is inputted to an anode of the first diode, and the output voltage is inputted to an anode of the second diode.

2. The power supply device of claim 1, wherein:
    the feedback circuit further includes a third diode connected to a second sensing voltage corresponding to an output current and the feedback circuit generates the feedback voltage by using a voltage generated from a current passing through a conducted diode of the first to the third diodes.

3. The power supply device of claim 2, wherein:
    a cathode of each of the first to the third diodes is electrically connected to the first contact point, and the second sensing voltage is inputted to an anode of the third diode.

4. The power supply device of claim 3, wherein:
    the feedback circuit further includes a photo diode connected electrically to the first contact point and a photo transistor including the photo diode and an opto-coupler, wherein the feedback voltage is controlled depending on a current flowing in the photo transistor.

5. The power supply device of claim 4, wherein:
    the feedback circuit further includes a voltage feedback unit which generates the first sensing voltage by amplifying a difference between a divided voltage generated by dividing the output voltage by at least two resistors and a predetermined first reference voltage.

6. The power supply device of claim 5, wherein the voltage feedback unit comprises:
    an operational amplifier including a first input terminal in which the divided voltage is inputted and a second input terminal in which the first reference voltage is inputted;
    a first resistor; and
    a capacitor connected between an output terminal of the operational amplifier and the first input terminal of the operational amplifier in series,
    wherein a voltage of the output terminal of the operational amplifier is the first sensing voltage and the output terminal of the operational amplifier is connected to the anode of the first diode.

7. The power supply device of claim 4, wherein:
    the feedback circuit further includes a current feedback unit generating the second sensing voltage by amplifying a voltage generated in an other resistor through which the output current flows.

8. The power supply device of claim 7, wherein the current feedback unit comprises:
    a first resistor including one end in which the voltage generated in the other resistor through which the output current flows is inputted;
    a second resistor connected to a first reference voltage and an other end of the first resistor;

an operational amplifier including a first input terminal connected to the other end of the first resistor and a second terminal in which a second reference voltage is inputted; and a third resistor and a capacitor connected between an output terminal and the first input terminal of the operational amplifier in series, wherein a voltage of the output terminal of the operational amplifier is the second sensing voltage and the output terminal of the operational amplifier is connected to an anode of the third diode.

9. The power supply device of claim 4, wherein
the resistor is connected to a cathode of the second diode and the first contact point and a second resistor is connected between the first contact point and an anode of the photo diode.

10. The power supply device of claim 4, wherein:
the power supply device includes a first coil having one end connected to the input voltage and an other end connected to the power switch and an auxiliary coil having a predetermined winding ratio with the first coil, and
the switch controller turns on the power switch when a zero detecting voltage reaches a predetermined turn-on reference voltage according to a voltage of the auxiliary coil and turns off the power switch when a predetermined sawtooth wave reaches the feedback voltage.

11. A feedback circuit supplying a feedback voltage for controlling a switching operation of a power switch in a power supply device converting an input voltage into an output power according to the switching operation of the power switch, the feedback circuit comprising:
a voltage feedback unit generating a first sensing voltage corresponding to an output voltage of the output power;
a first diode connected to the first sensing voltage; and
a second diode connected to the output voltage and in series with a resistor,
wherein the feedback voltage is generated by using a voltage generated from a current passing through a conducted diode of the first and the second diodes,
wherein a cathode of each of the first to the second diodes is electrically connected to a first contact point, the first sensing voltage is inputted to an anode of the first diode, and the output voltage is inputted to an anode of the second diode.

12. The feedback circuit of claim 11, further comprising:
a current feedback unit generating a second sensing voltage corresponding to an output current; and
a third diode connected to the second sensing voltage,
wherein the feedback voltage is generated by using a voltage generated by a current passing through a conducted diode of the first to the third diodes.

13. The feedback circuit of claim 12, wherein:
a cathode of each of the first to the third diodes is electrically connected to the first contact point, and the second sensing voltage is inputted to an anode of the third diode.

14. The feedback circuit of claim 13, further comprising:
a photo diode connected electrically to the first contact point and a photo transistor including the photo diode and an opto-coupler,
wherein the feedback voltage is controlled depending on a current flowing in the photo transistor.

15. The feedback circuit of claim 14, wherein the voltage feedback unit comprises:
a first resistor including one end in which the output voltage is inputted;
a second resistor connected to an other terminal of the first resistor;
an operational amplifier including a first input terminal connected to a contact point of the first resistor and the second resistor and a second terminal in which a predetermined first reference voltage is inputted; and
a third resistor and a capacitor connected between an output terminal and the first input terminal of the operational amplifier in series,
wherein a voltage of the output terminal of the operational amplifier is the first sensing voltage and the output terminal of the operational amplifier is connected to an anode of the first diode.

16. The feedback circuit of claim 14, wherein the current feedback unit comprises:
a first resistor including one end in which the voltage generated in an other resistor where the output current flows is inputted;
a second resistor connected between an other end of the first resistor and a predetermined first reference voltage;
an operational amplifier including a first input terminal connected to the other end of the first resistor and a second terminal in which a second reference voltage is inputted; and
a third resistor and a capacitor connected between an output terminal and the first input terminal of the operational amplifier in series,
wherein a voltage of the output terminal of the operational amplifier is the second sensing voltage and the output terminal of the operational amplifier is connected to an anode of the third diode.

17. The feedback circuit of claim 14, further comprising:
a second resistor connected between the first contact point and an anode of the photo diode,
wherein the resistor is connected to a cathode of the second diode and the first contact point.

* * * * *